April 5, 1960
E. FERMI
2,931,762
NEUTRONIC REACTOR
Filed May 12, 1945
4 Sheets-Sheet 1
FIG.2.
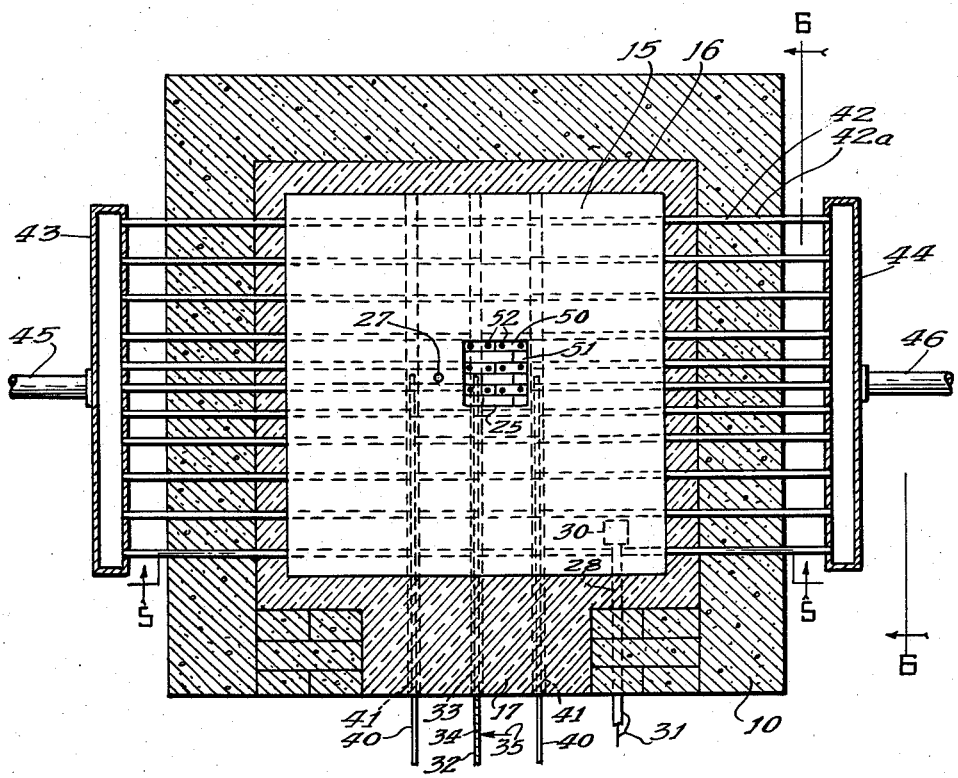
FIG.1.
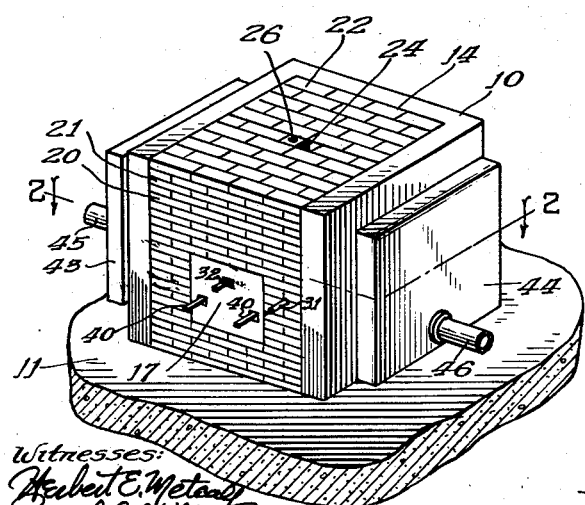
FIG.3.
FIG.4.
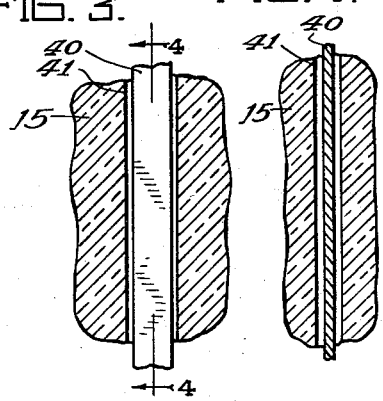
Witnesses:
Herbert E. Metcalf
Raymond S. Winslow
Inventor:
Enrico Fermi
By Robert A. Lavender
Attorney

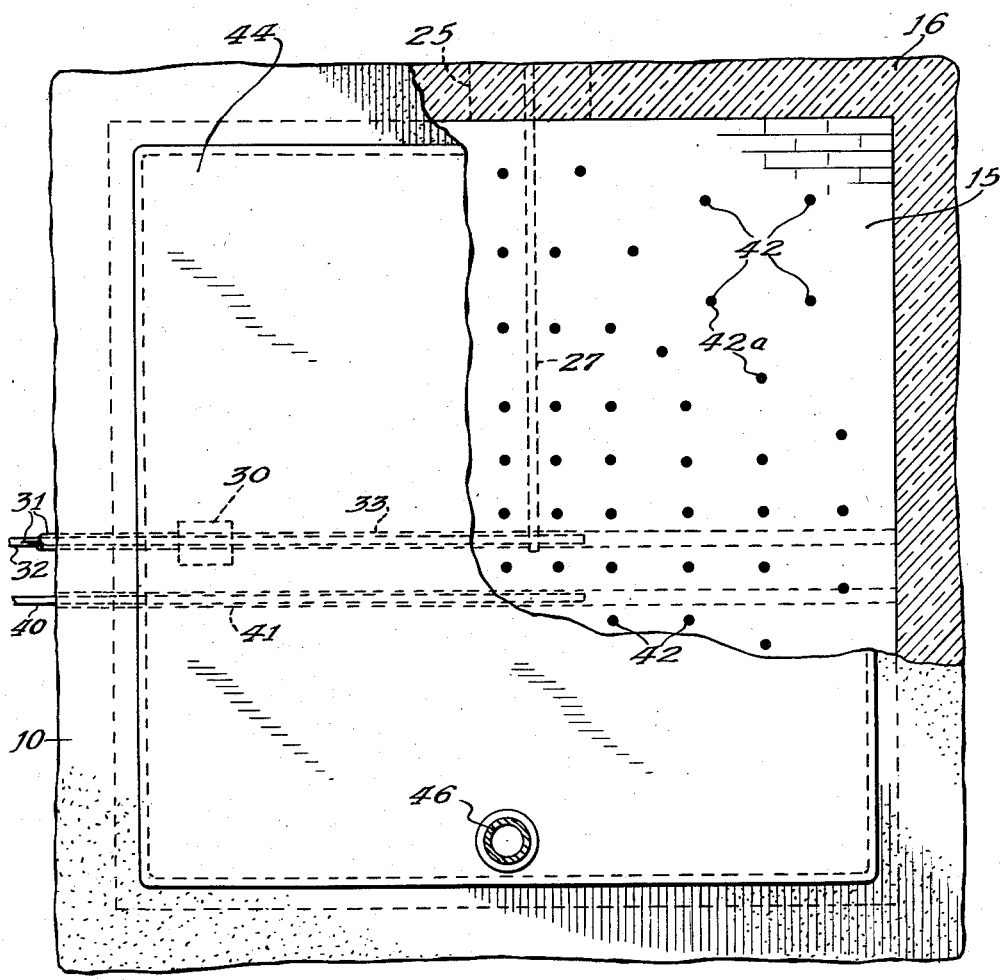

April 5, 1960  E. FERMI  2,931,762
NEUTRONIC REACTOR
Filed May 12, 1945  4 Sheets-Sheet 4

Witnesses:

Inventor:
Enrico Fermi

2,931,762

NEUTRONIC REACTOR

Enrico Fermi, Santa Fe, N. Mex., assignor to the United States of America as represented by the United States Atomic Energy Commission Application May 12, 1945, Serial No. 593,510

2 Claims. (Cl. 204—193.2)

My invention relates to the general subject of nuclear fission and particularly to the establishment of self-sustaining neutron chain reactions, compositions of matter and methods of producing such compositions suitable for use in creating a self-sustaining chain reaction by nuclear fission of uranium by slow neutrons in a neutronic reactor.

Certain isotopes, $U^{235}$, $U^{233}$, $94^{239}$ or other isotopes of element 94 can be split or fissioned by bombardment with thermal neutrons, i.e., neutrons in or close to thermal equilibrium with the surrounding medium, and the neutrons producing fission give rise to new fission neutrons in sufficiently large numbers to overcome the various neutron losses in the system. Since the result of the fission of the uranium nucleus is the production of two lighter elements with great kinetic energy, plus approximately 2 neutrons for each fission along with beta and gamma radiation, a large amount of power can be made available.

Most of the neutrons arising from the fission process are set free with the very high energy of above one million electron volts average and are therefore not in condition to be utilized most efficiently to create new thermal fissions in $U^{235}$ or similar isotope. The fast fission neutrons, after they are created, are slowed down to thermal energies before they produce fresh fission by bombardment of additional $U^{235}$ atoms. When the system is made in which neutrons are slowed down without much absorption until they reach thermal energies and then mostly enter into uranium rather than into any other element, a nuclear chain reaction is obtained even with natural uranium. Light elements, such as deuterium, beryllium, or carbon, the latter in the form of graphite, can be used as slowing agents, or moderators. Carbon in the form of graphite, for example, is a relatively inexpensive, practical and readily available moderator for slowing fast neutrons to thermal energies.

During the chain reaction heat is developed and in order that the reaction may be conducted at a rapid rate it is necessary to remove this heat from the reactor. In accordance with the present invention it has been found that the reactor may be effectively cooled by passing a coolant through the moderator through channels which are spaced from the uranium bodies disposed in the moderator. By cooling in this manner problems which arise due to corrosion of the uranium or contamination of the coolant when the coolant is passed in contact with or in heat exchange relationship with the uranium, are substantially minimized or eliminated.

Certain principles respecting neutron reactors and their application to the present invention are discussed below.

The ratio of the fast neutrons produced in one generation by the fissions to the original number of fast neutrons in a system of infinite size using specific materials is called the reproduction or multiplication factor of the system, and is denoted by the symbol K. If K can be made sufficiently greater than unity to create a net gain in neutrons in the system and the system made sufficiently large so that this gain is not entirely lost by leakage from the exterior surface of the system, then a self-sustaining chain reacting system of finite and practical size can be built to produce power by nuclear fission of natural uranium. The neutron reproduction ratio ($r$) in a system of finite size differs from K by the external leakage factor, and this must be sufficiently greater than unity to permit the neutron density to rise exponentially. Such rise will continue indefinitely if not controlled at a desired density corresponding to a desired power output. Such control is feasible and will be later described.

It is therefore important to so construct a system comprising uranium and a slowing medium in which neutron losses are reduced to such extent that a controllable self-sustaining neutron chain fission reaction is obtained therein, with resultant regulated production of neutrons, liberation of power in the form of heat, the production of radioactive fission products and new elements both radioactive and stable produced by the absorption of neutrons in uranium.

During the interchange of neutrons in a system comprising bodies of uranium of any size disposed in a neutron moderator, neutrons may be lost to the chain reaction in four ways:

(1) By absorption or capture in the uranium content of the bodies without producing fission, (2) By absorption or capture in the moderator material itself, (3) By leakage out of the system through the periphery thereof, (4) And by absorption or capture by the impurities present in both the uranium bodies and the moderator.

These loses will be considered in the order named, as any one of these losses, if too high, can prevent a self-sustaining chain reaction from being attained.

Natural uranium, particularly by reason of its $U^{238}$ content, has an especially strong absorbing power for neutrons when they have been slowed down to moderate so-called resonance energies. The absorption in uranium at these energies is termed the uranium resonance absorption or capture. The neutrons are captured by the isotope $U^{238}$. This capture does not result in fission but leads to the creation of the relatively stable nucleus $94^{239}$. Neutron resonance absorption in uranium may take place either on the surface of the uranium bodies, in which case the absorption is known as surface resonance absorption, or it may take place further in the interior of the uranium body, in which case the absorption is known as volume resonance absorption. Volume resonance absorption is due to the fact that some neutrons make collisions inside the uranium body and may thus arrive at resonance energies therein. After successfully reaching thermal velocities, a portion of the neutrons are subject to capture by $U^{238}$ without fission leading to the production of $94^{239}$.

When fission occurs by neutron capture, the following reaction takes place:

$$_{92}U^{235}+n \rightarrow A-B-\text{about } 2n \text{ (average)}$$

$A=$"Light" fission fragment, e.g., Br, Kr, Rb, Sr, Y, Zr, Cb, Mo, 43, Ru, Rh. Atomic mass 83–99 inclusive. Atomic number, 34–45 inclusive.

$B=$"Heavy" fission fragment, e.g., Sb, Te, I, Xe, Cs, Ba, La, Ce, Pr, Nd. Atomic mass, 127–141 inclusive. Atomic number 51–60 inclusive.

The fission elements are unstable and radioactive with half-lives varying in length in accordance with the element formed.

When a neutron is absorbed by $U^{238}$ without fission taking place the following reaction occurrs:

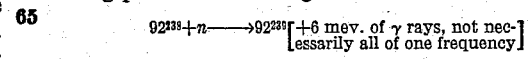

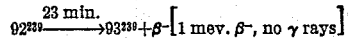

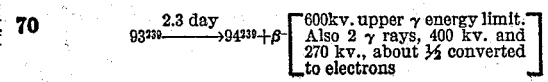

It is possible, by proper physical arrangement of the materials to reduce substantially the uranium resonance absorption. By the use of light elements as described above for moderators a relatively large increment in energy loss is achieved in each collision and therefore, fewer collisions are required to slow the neutrons to thermal energies, thus decreasing the probability of a neutron being at a resonance energy as it enters a uranium atom. During the moderation, however, neutrons are diffusing through the slowing medium over random paths and distances so that the uranium is not only exposed to thermal neutrons, but also to neutrons of energies varying between the energy acquired by reason of fission and thermal energy. Neutrons at uranium resonance energies will, if they enter uranium at these energies, be absorbed on the surface of a uranium body, whatever its size, giving rise to surface absorption. Any substantial reduction of overall surface of the same amount of uranium will reduce surface absorption, and any such reduction in surface absorption will release neutrons to enter directly into the chain reaction.

For a given ratio of slowing material to uranium, surface resonance absorption losses of neutrons in the uranium can be substantially reduced by a large factor when the uranium is aggregated into substantial masses in which the mean spatial diameter is at least about 0.5 centimeter for natural uranium metal and somewhat larger when the bodies are of a uranium compound as hereinafter more fully discussed. For example with $UO_2$ the minimum radius of 0.75 centimeter and with other uranium compounds a similar variation from metallic uranium may be observed. The degree of this variation is dependent upon the density of the uranium compound, its bulk density, and the absorption coefficient of other elements therein for neutrons. In any event the uranium may be placed in the system in the form of geometrically spaced uranium masses or bodies of substantial size, preferably either of metal, oxide, carbide, or combinations thereof. The uranium bodies can be in the form of layers, rods, or cylinders, cubes or spheres, or approximate shapes, dispersed throughout the graphite. Optimum conditions are obtained with natural uranium by using metal spheres.

The K factor of a mixture of fine uranium particles in graphite assuming both of them to be theoretically pure, would only be about .785. Actual K factors as high as 1.09 have been obtained using aggregation of natural uranium in the best known geometry in graphite, and with as pure materials as is presently possible to obtain.

Assuming theoretically pure graphite, and theoretically pure natural uranium metal of the highest presently obtainable densities of about 18 gms./cm.$^3$, the maximum possible K factor theoretically obtainable is about 1.1 when the uranium is aggregated with optimum geometry. Still higher K factors can be obtained in uranium having more than the naturally occurring content of fissionable elements or by the use of different moderators in place of carbon. Adding such fissionable material is termed enrichment of the uranium.

Neutrons are also subject to capture by the moderator. While carbon and beryllium have very small capture cross sections for thermal neutrons, and deuterium still smaller, an appreciable fraction of thermal neutrons, about 10 percent of the neutrons present in the system under best conditions when graphite is used, is lost by capture in the graphite atoms during diffuson therethrough. It is therefore desirable to have the neutrons reaching thermal energy promptly enter uranium.

When the system has a K factor greater than unity, the uranium will support a chain reaction providing an exponential rise in neutron density, if the overall size of the system is sufficiently large to overcome the loss of neutrons escaping from the system. Thus the overall size is important.

The overall size of the system will vary, depending upon the value of the K factor of the system. If the reproduction factor K is greater than unity, the number of neutrons present will increase exponentially and indefinitely, provided the structure is made sufficiently large. If, on the contrary, the structure is small, with a large surface-to-volume ratio, there can be a rate of loss of neutrons from the structure by leakage through the outer surfaces, which may overbalance the rate of neutron reproduction inside the structure so that a chain reaction will not be self-sustaining. For each value for the reproduction factor K greater than unity, there is thus a minimum overall size of the lattice structure known as the critical size wherein the reproduction ratio is unity. The rate of diffusion of neutrons away from a large structure in which they are being created through the exterior surface thereof may be treated by mathematical analysis when the value of K is known.

In the case of a spherical structure employing uranium bodies of any shape or size imbedded in a carbon slowing material, the following formula gives the approximate overall radius for critical or operating size:

$$K-r=C/R^2$$

where R is the radius in feet, $r$ is the reproduction ratio which for an operative reactor cannot be below unity and for critical size is unity and C is a constant which is dependent on the detail of the lattice. For the aforementioned carbon lattice, the value of C is of the order of 7 to 8 whereas with heavy water as the moderator the value of C is about 3.

For a parallelopiped structure rather than spherical, the critical or operating size can be computed from the formula:

$$K-r=C\left(\frac{1}{a^2}+\frac{1}{b^2}+\frac{1}{c^2}\right)$$

where $a$, $b$, and $c$ are the lengths of the sides in feet. The critical or operating size for a cylindrical structure is given by the formula:

$$K-r=C\left\{\frac{1}{h^2}+\frac{.59}{R^2}\right\}$$

where $h$ is the height and R is the radius, both in feet irrespective of the shape of the uranium bodies. When operating sizes are to be found the value of $r$ desired (for example $r=1.005$) is to be used in the computation.

However, even when the first three above-mentioned losses are reduced to a practical minimum, no self-sustaining chain reaction can be obtained in any system unless impurities in the materials used for the reaction are reduced to such an extent that the loss by parasitic capture by such impurities will not prevent the reaction from becoming self-sustaining. Impurities present in both the uranium and the moderator consequently constitute a very important neutron loss factor in the chain. The effectiveness of various elements as neutron absorbers varies tremendously.

Certain elements such as boron, cadmium, samarium, gadolinium, and some others, for example, if present even in a few parts per million, could very likely prevent a self-sustaining chain reaction from taking place. It is highly important, therefore, to remove as far as possible all impurities capturing neutrons to the detriment of the chain reaction from both the slowing material and the uranium. If these impurities are present in too great quantity, the self-sustaining chain reaction cannot be attained. The permissible amounts of impurities will vary for each specific geometry, depending upon such considerations as the form in which the uranium is used— that is, whether natural or enriched, whether as metal or oxide. The type of slowing down material used— for example, whether deuterium, graphite, or beryllium— also influences the effect of impurities, as do the weight ratios between the uranium and the slowing down material. Elements such as oxygen may be present, and, as previously suggested, the uranium may be in the form of oxide, such as $UO_2$ or $U_3O_8$, a carbide, or fluoride, but the metal is preferred since it is more dense and more free from neutron absorbers. Nitrogen may be present in the reactor in fairly large amounts, and its effect on the chain reaction is such that the neutron reproduction ratio of the system may be changed by changes in atmospheric pressure. This effect may be eliminated by excluding nitrogen from the system, or by sealing the system from the effects of changes of atmospheric pressure.

The effect of impurities on the optimum reproduction factor K may be conveniently evaluated by means of certain constants known as "danger coefficients" which are assigned to the various elements. These danger coefficients for the impurities are each multiplied by the percent by weight of the corresponding impurity, with respect to the weight of uranium in the system, and the total sum of these coefficients gives a value known as the total danger sum. This total danger sum is subtracted from the reproduction factor K as calculated for pure materials and for the specific geometry and materials under consideration.

The danger coefficients are defined in terms of the ratio of the weight of impurity per unit mass of uranium and are based on the cross section for absorption of thermal neutrons of the various elements. These values may be obtained from physics textbooks on the subject and the danger coefficient computed by the formula $$\frac{T_i}{T_u} \cdot \frac{A_u}{A_i}$$

wherein $T_i$ represents the cross section for the impurity and $T_u$ the cross section for the uranium, $A_i$ the atomic weight of the impurity and $A_u$ the atomic weight for uranium. Regardless whether the impurities are in the carbon or in the uranium, they are computed as their percent by the weight of the uranium in the system.

Danger coefficients for some elements are given in the following table, wherein the elements are listed in order of their atomic number:

| Element | Danger Coefficient | Element | Danger Coefficient |
|---|---|---|---|
| $H^1$ | 10 | Mo | 1.0 |
| $D^2$ | 0.01 | Ru | ~2 |
| He | 0 | Rh | 50 |
| Li | 310 | Pd | ~2 |
| Be | 0.04 | Ag | 18 |
| B | 2,150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | <3 | I | 1.6 |
| Na | 0.65 | Xe | <6 |
| Mg | 0.48 | Cs | 8.7 |
| Al | 0.30 | Ba | 0.30 |
| Si | 0.26 | La | <2.4 |
| P | 0.3 | Ce | <2.4 |
| S | 0.46 | Pr | <2.4 |
| Cl | 31 | Nd | ~17 |
| A | ~0.8 | Sm | ~1,430 |
| K | 2.1 | Eu | 435 |
| Ca | 0.37 | Gd | ~6,320 |
| Sc | <7 | Tb | ~20 |
| Ti | 3.8 | Dy | ~200 |
| V | 4 | Ho | ~10 |
| Cr | 2 | Er | ~40 |
| Mn | 7.5 | Tm | ~20 |
| Fe | 1.5 | Yb | ~10 |
| Co | 17 | Lu | ~30 |
| Ni | 3 | Hf | ~20 |
| Cu | 1.8 | Ta | 4.6 |
| Zn | 0.61 | W | 2.7 |
| Ga | ~1 | Re | ~18 |
| Ge | (<5) | Os | <1.7 |
| As | 2 | Ir | ~70 |
| Se | 6.3 | Pt | ~2.5 |
| Br | 2.5 | Au | 16 |
| Kr | <6 | Hg | 82 |
| Rb | ~0.4 | Tl | 0.5 |
| Sr | 0.57 | Pb | 0.03 |
| Y | 0.4 | Bi | 0.0025 |
| Zr | ~0.13 | Th | 1.1 |
| Cb | <0.4 | | |

The sum of the danger coefficients of the impurities in any given composition entering into a reactor as multiplied by the percent by weight of the uranium in the reactor is known as total danger sum of the composition. This figure is a dimensionless constant like K and accordingly can be directly subtracted from K. It will be noted that the danger coefficients given are related to the neutron absorption value of unity for uranium.

As a specific example, if the materials of a system under consideration have 0.01 percent by weight of each of the elements Co and Ag with respect to the weight of the uranium in the system, the total danger sum in K units for such an analysis would be:

$$.0001 \times 18 + .0001 \times 17 = .0035$$

This figure can then be subtracted from the K calculated for theoretically pure materials to give the actual K factor for the geometry and materials used. This would be a rather unimportant reduction in the reproduction factor K unless the reproduction factor K for a given geometry and materials without considering impurities, is very nearly unity. If, on the other hand, the impurities in the uranium are Li, Co, and Rh in the same percentage, the total danger sum would be:

$.0310 + .0017 + .0050 = .0377$ reduction in K due to impurities.

The maximum possible K factors for neutronic reaction systems when optimum geometry is used, and where the materials used are assumed to be theoretically pure, have been calculated approximately as follows:

| Materials | K for Pure Materials |
|---|---|
| U metal—graphite moderator | 1.1 |
| U oxide—graphite moderator | 1.07 |
| U metal—beryllium moderator | 1.18 |
| U metal—beryllium oxide moderator | 1.09 |
| U metal—heavy water moderator | 1.3 |

It can readily be seen from the above tabulation that the total danger sum for impurities in both the uranium and moderator must be less than .3 in order that the K factor remain equal to or greater than unity with a moderator such as a deuterium moderator, .18 for a beryllium moderator, and .1 for a graphite moderator.

The permissible reduction in K due to impurities will vary in accordance with the type of reactor to be built. In the first place, the maximum K factors listed above are, as pointed out above, present only in systems of infinite size, whereas a practical system, in order to be capable of construction, must be within the bounds of space, weight and economy. The following table will show the critical sizes required for operative reactors utilizing graphite, and deuterium in the form of heavy water, for different values of K. In evaluating the following table it must be kept in mind that the critical size is that size where the chain reaction just will become self-sustaining. In any practical system the ratio of neutrons produced by fission to the neutrons absorbed

| | Approximate Critical Sizes in Feet | |
|---|---|---|
| | Sphere radius | Cube side |
| U Metal—graphite, K-1: | | |
| .01 | 27.2 | 47 |
| .02 | 19.4 | 33.6 |
| .03 | 15.7 | 27.2 |
| .05 | 12.1 | 21.0 |
| .1 | 8.6 | 14.9 |
| U Metal—heavy water, K-1: | | |
| .01 | 17 | 30 |
| .02 | 12 | 21 |
| .05 | 8 | 13 |
| .1 | 5.5 | 9.5 |
| .2 | 4 | 7 |
| .3 | 3 | 5.5 | to produce fission in each generation must be slightly greater than unity to permit the neutron density to rise to a desired power output. This reproduction ratio in a system of finite size is generally preferred to be around 1.005 but may be lower. Consequently the reactors as built would have to be slightly larger in size than the critical sizes given below, in order to be operative without neutron reflectors. With neutron reflectors somewhat smaller reactors may be operated.

During the neutron chain reaction heat is evolved. About 92 percent of total heat generated in a chain reacting system originates in the uranium, about 6 percent originates in the moderator, where graphite is used. The remaining 2 percent is generated outside the pile, that is, in the surrounding structures. Heat also is conducted into the moderator from the uranium bodies.

Following is a table showing more specifically the type and locale of the heat generated in a uranium-carbon system:

1. SUMMARY BY TYPE

|  | Mev. per fission | Percent |
|---|---|---|
| Gamma radiation | 23 | 11 |
| Beta radiation | 11 | 6 |
| Kinetic energy of fission fragments | 159 | 79 |
| Kinetic energy of neutrons | 7 | 4 |
|  | 200 | 100 |

2. SUMMARY BY LOCALE WHERE HEAT IS GENERATED

|  | Mev. per fission | Percent |
|---|---|---|
| In uranium | 184 | 92 |
| In carbon | 12 | 6 |
| Outside pile | 4 | 2 |
|  | 200 | 100 |

3. SUMMARY BY TYPE AND LOCALE

|  | Mev. per fission | Percent in U | Percent in C | Percent Outside |
|---|---|---|---|---|
| Kinetic energy of fission fragments | 159 | 100 |  |  |
| Kinetic energy of neutrons | 7 |  | 90 | 10 |
| Gamma radiation from fission fragments and products | 5 | 70 | 25 | 5 |
| Beta radiation from fission fragments and products | 11 | 100 |  |  |
| Nuclear affinity of neutrons (gamma radiation) | 18 | 60 | 25 | 15 |

In order to control the temperature of the chain reaction and to prevent the accumulation of heat in the chain reacting system, a suitable circulating system can be employed to convey the heat away from the pile, when a large power output is desired. The design of this system within the pile proper, and the type of coolant employed are critical factors which, if not properly taken into consideration, will make it impossible to design a cooled pile capable of producing a self-sustaining chain reaction.

The problem of removing heat from a chain reacting system by means of a coolant is complicated by various factors. The corrosive effect on uranium of most otherwise suitable circulating media is very troublesome. This factor is important primarily because of the presence in the system of high temperatures and intense neutron densities causing an acceleration of normal rates of corrosion. One of the most serious consequences which may result from the corrosive action of a circulating medium on the uranium is the physical deterioration of the uranium in the system. It is essential then that the circulating system be of such a character as not to destroy the uranium bodies in the system. Furthermore, many otherwise suitable cooling media absorb neutrons to such an extent that they cannot be used in large quantities in the pile, and only certain metals can be used for tubing to conduct the coolant through the pile.

In the present system, a liquid, such as water or diphenyl, or other coolant, is used as the circulating medium to remove heat from the structure, conducted through tubing of aluminum, lead or copper, for example. The water is circulated through a controlled number of such tubes placed in the moderator of the system and spaced from the uranium. Therefore, the corrosion problem with respect to the uranium and furthermore contamination of the coolant with radioactive fission products from the uranium is avoided or at least minimized. The heat is transferred from the uranium to the coolant by conduction through the moderator, despite the fact that most of the heat is generated in the uranium, cooling the moderator permits effective operation of the reactor at relatively high power outputs for example from 5,000 to 10,000 kilowatts, continuously and without stopping the chain reaction. At such powers moderator cooling presents the further advantage of simplicity, and permits loading and unloading of the reactor without interference with the cooling system.

It is, therefore, an object of my invention to provide a means and method of cooling the moderator of a chain reacting pile at a point or points spaced from the fissionable component disposed in the moderator.

It is still another object of my invention to dissipate sufficient heat during the operation of a chain reacting system to permit continuous operation of the system at high neutron densities.

A further object of my invention is to provide a means and method of circulating a neutron absorbing cooling fluid through a chain reacting system, under conditions such that a chain reaction therein may be maintained.

The above and other objects, features and advantages of my invention will become apparent to those skilled in the art when taken in connection with the following description and the accompanying drawings wherein:

Fig. 1 is a schematic perspective view of the exterior of a chain reacting system;

Fig. 2 is a horizontal cross section on line 2—2 in Fig. 1 with the active portion of the reactor shown in plan;

Fig. 3 is a fragmentary horizontal section with the safety rod in plan, and showing the safety rod and slot;

Fig. 4 is a fragmentary vertical section on line 4—4 in Fig. 3;

Fig. 6 is a view partly in elevation and partly in section as indicated by the line 6—6 in Fig. 2;

Fig. 7 is a top view, broken away, of a live graphite block;

Fig. 8 is an irregular vertical section substantially on line 8—8 in Fig. 7;

Fig. 9 is an elevation, broken away, of a dead graphite block;

Fig. 12 is a vertical section of a cooling tube in graphite.

Figure 5:
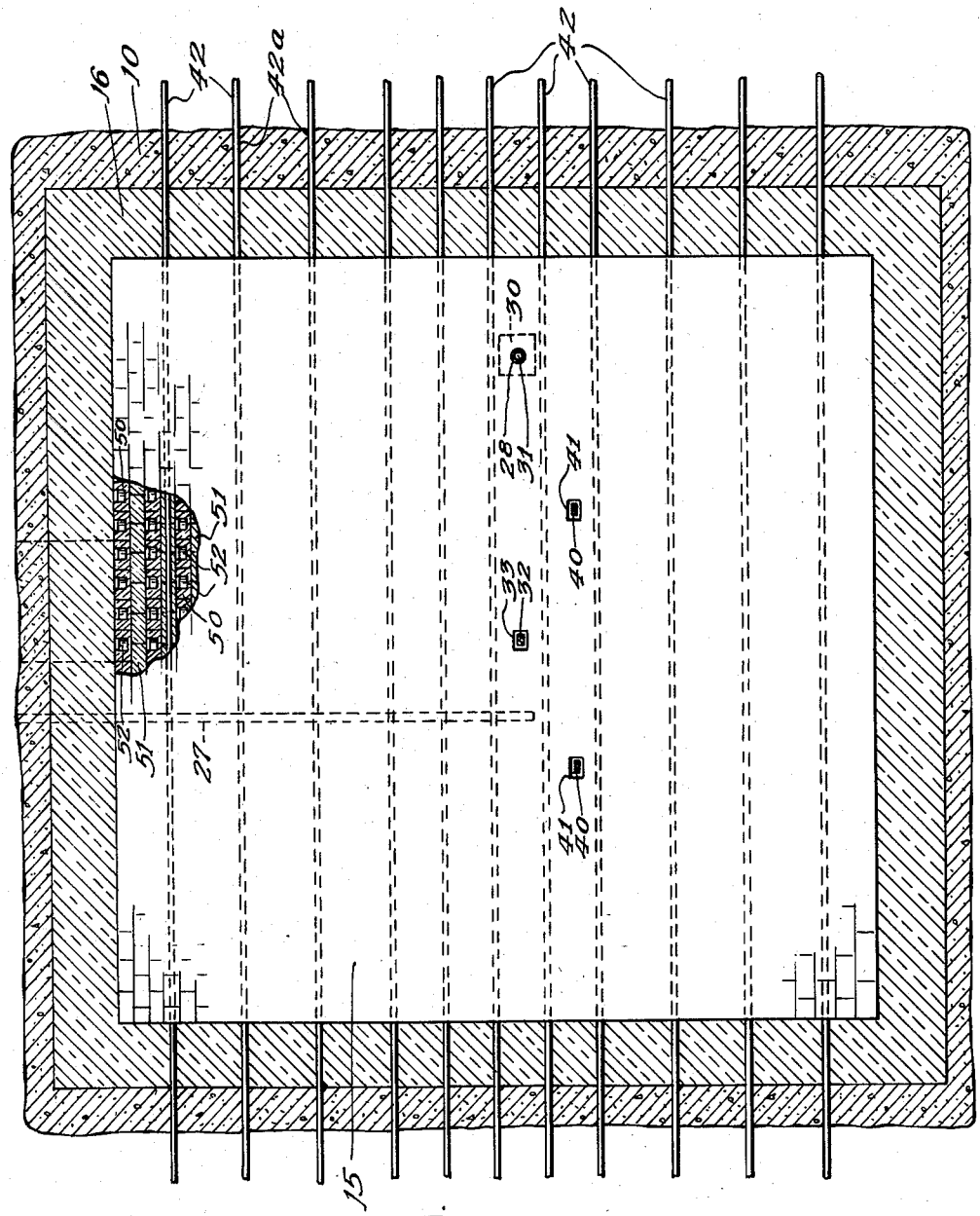
Fig. 5 is a vertical section on line 5—5 in Fig. 2 with the headers and part of the concrete walls removed and with a portion broken away.

As a self-sustaining chain reaction is not known to be possible with natural uranium and graphite without aggregation of the uranium into bodies of substantial size, I prefer to illustrate my invention by description of a moderator-cooled, self-sustaining chain reacting system, in which the active portion is cubical, and in which highly purified uranium metal cylindrical lumps are utilized, imbedded in high quality graphite. The effect of impurities in the graphite is substantially the same as in the uranium since the neutrons diffuse freely in both materials.

Referring first to Figs. 1 and 2 illustrating the completed structure, side walls 10 are erected on a heavy foundation 11, both preferably of poured concrete about 5 feet thick, leaving a vault space 14 inside walls 10 in which is built up, as will be explained later, an active portion 15 (Fig. 2) surrounded by a graphite reflector 16 which essentially encases the reactor itself. The reflector is built with a graphite projection 17 which extends to a plane flush with the outer surface of front wall 20 also 5 feet thick, formed of concrete bricks 21. The top of the structure is closed with covering bricks 22 also of concrete and 4 feet thick. The top covering is pierced by an aperture 24 which constitutes the mouth of a well 25 extending to at least the peripheral layer of uranium bodies in the active portion 15. A second aperture 26 is the exterior opening of a shaft 27 extending to the center of the structure.

Also entering the active portion 15 is a slot 28 at the end of which is positioned an ionization chamber 30 connected to the exterior by wire line 31.

Extending from the outside of projection 17 into the center of active portion 15 is a control rod 32 sliding in an aluminum-lined slot 33 in the graphite. A scale 34 is provided on control rod 32 cooperating with a suitable index diagrammatically illustrated at 35 to indicate the depth of penetration of the control rod 32 as shown in Fig. 2. Also extending into the active portion 15 through projection 17 are two spaced safety rods 40 operating in slots 41. Safety rods 40 and control rod 32 are preferably flat sheets of cadmium or cadmium clad steel, as shown in Figs. 3 and 4, and are arranged to move freely in and out of slots 33 and 41, respectively.

Water tubes 42 pass horizontally through holes 42a in the concrete side walls and pass through the active portion 15. On each side of the system the tubes enter headers 43 and 44 having connecting pipes 45 and 46, respectively, for coolant connection. A total of 97 tubes are used, disposed in a special pattern, as will later be described.

This completes the gross structure of the device. The active portion 15 will next be described.

The active self-sustaining chain reacting portion 15 to be built up within vault 14 is designed to so reduce neutron losses as to make a self-sustaining chain reaction possible, as has been previously outlined, using specific types and sizes of uranium metal masses, embedded in graphite, all of best obtainable purity, the uranium being spaced with a specific geometry.

In the system illustrated, the graphite is in the form of blocks or bricks having dimensions of 4"×4"×16", these blocks having been planed by woodworking machinery to have smooth rectangular sides. The danger sum of impurities in the graphite is below about 0.02. Certain of the blocks 50 are drilled with two holes spaced 8" (20 cm.) center to center to receive the uranium bodies which are placed therein as shown in Figs. 5 to 8, inclusive. These graphite blocks 50 are termed live graphite. Other blocks 51, as shown in Fig. 9, contain no uranium and may be termed dead graphite. The uranium bodies are cast uranium metal cylinders 52 having a density of 18 grams per cubic centimeter and a danger sum for impurities less than 0.01 each cylinder being about 2¼" in diameter, and 2¼" in height, weighing about 6 pounds each.

The active portion 15 of the structure, built inside the vault, has about 30 layers of live graphite, alternating with layers of dead graphite to form a cube having side dimensions of approximately 6 meters. A total amount of graphite of approximately 240 tons is used in the active portion. Approximately 80 tons of exceptionally pure cast uranium metal bodies are used for the cylinders. The total number of uranium bodies is about 27,000. The volume ratio is about 35 carbon to 1 uranium.

The spacing of the uranium elements in the graphite is such that each unit cell comprising one uranium body and surrounding graphite has a side size of 20 centimeters. The arrangement of the bodies in the graphite is similar to that of a cubic crystal lattice. The K factor for the metal bodies 52 and graphite alone is about 1.07, without including the tubes 42. This K factor is sufficiently high so that a system of practical size can be built to have a reproduction ratio greater than unity even when impurities in the form of 97 tubes having a wall thickness of from 1.5 to 2 millimeters and an internal diameter of 1.5 centimeters filled with a coolant such as water are included in the system. The tubes and the contained water only reduce the K factor to about 1.06, this K being still sufficiently high to permit the side dimension of 6 meters when built in the form of a cube. In such a reactor it will be noted that the amount of coolant is apportioned so that the reproduction ratio ($r$) is at least unity after losses for leakage, pipes, and other absorbers has been taken into consideration. Since for control purposes it is undesirable to permit the reproduction ratio from exceeding about 1.01 failure of coolant flow must be avoided since the removal of coolant from the system might increase the reproduction factor above this figure. Thus the amount of coolant in the reactor must be carefully apportioned so that $r$ does not exceed about 1.01. Lead absorbs slightly more neutrons than aluminum, but still can be used without greatly enlarging the system. Copper tubes and water introduce a K loss of about about 3 percent and while copper can be used, the reduction in K requires that the system be considerably increased in size. Aluminum tubes are, therefore, preferred to permit the smallest size of structure.

The actual construction of the pile is started by placing on the foundation of vault 14 several layers of dead graphite blocks to start reflector 16, after which the active portion 15 may be started by piling up alternate layers of dead graphite and live graphite, filling the edges of both live and dead layers out to the concrete side walls with dead graphite to continue the reflector 16. The blocks are closely packed without cement to eliminate air spaces as far as possible. Because of the block type of construction, the system is termed a pile. As the stacking continues, the tubes 42 are installed. This is done as shown in Fig. 12, by splitting a row of dead graphite blocks longitudinally in halves 53, routing out channels for the tubes, laying the tubes in the lower halves and then covering with the upper halves. The clearance between graphite and tube should be as small as possible, from .002" to .005".

Figure 10:
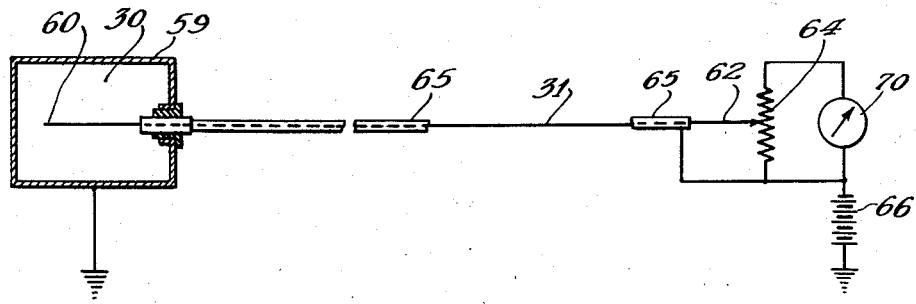
Fig. 10 is a diagram showing a neutron density measuring device and circuit.

When slightly less than half the required number of layers have been piled in the vault, the aluminum-lined slots 41 are provided in a dead carbon layer through which the safety rods slide, and the safety rods 40 installed. After a few more layers are added to the pile, the aluminum-lined control rod slot 33 is built in, the control rod 32 inserted, and the ionization chamber 30 installed. Wire line 31 is led to the outside and connected to a monitoring circuit, as shown in Fig. 10.

Ionization chamber 30 may comprise a sealed metal casing 59 containing approximately 18 liters of boron fluoride at one atmosphere pressure into which projects a central electrode 60. The central electrode is connected through central wire 31 to a contact 62 adjustable across resistor 64. One end of resistor 64 is connected to an outer wire shield 65 and to a battery 66 of about 450 volts potential, the other end of which is grounded, as is casing 59. The other end of resistor 64 is connected through galvanometer 70 to the wire shield side of battery 66. Neutron absorption by the boron in the chamber causes alpha ray ionization in the chamber, the amount thereof being measured by galvanometer 70. Only the ionization chamber need be in the pile, with the galvanometer positioned up to 300 feet away, and as the neutron density at any given point in the reactor bears a substantially constant relationship with the neutron density at any other point in the reactor the chamber may be in the outer layers of the active portion.

The galvanometer deflection is only approximately linear with neutron density, but is reproducible and readily calibrated in terms of neutron density, power or heat, as desired.

Construction is continued, layer by layer including the tubes 42, with the control rod and safety rods fully inserted into the pile. Matching blocks bored with a 3" hole between the uranium bodies in the live blocks, and similar holes in proper position in the dead blocks are alined as layers are added to provide shaft 27.

Preferably, at least from the halfway point, the natural neutron density in the pile is monitored as layers are added with water placed in such tubes 42 as are already installed. By plotting the change in neutron density values within the pile as layers are added thereto, with the control rod and safety rods withdrawn, a prediction can be made in advance as to when the chain reaction in the structure will become self-sustaining. The personnel building the pile can thus be warned that the cirtical size is being approached.

With the safety and control rods fully inserted into the structure, the active portion 15 and the reflector 16 are completed to the final size desired, with additional dead carbon blocks being positioned over the top thereof to complete the reflector 16, leaving well 25 and the shaft 27 open. Usually the reactor is constructed somewhat oversize and sufficient neutron absorbers inserted as fixed limiting or shim rods which limit the ultimate neutron reproduction ratio so that it can not exceed a maximum of 1.01 and usually about 1.005. Such rods or a portion may be removed later if the reproduction factor should change due to poisoning by fission products or for other cause. When the active portion is complete the top and front of the vault are closed, except for the outward continuation of well 25 and shaft 27 by means of the cement blocks. The headers 43 and 44 are connected to tubes 42. A structure is thus obtained having an active portion 15 therein, surrounded by a carbon reflector 16, and enclosed in concrete walls on all sides except for the carbon projection 17 utilized to carry the control and safety rods to the exterior of the vault, and provided with means for circulating fluid through the moderator of the active portion.

The structure has been shown as surrounded with a layer 16 of graphite, which will reflect back into the active portion some of the neutrons which might otherwise diffuse out of the system. As neutrons diffuse through this layer in random paths, a small percentage of the neutrons entering the layer are turned around and re-enter the active portion 15. To the extent that the neutrons are returned to the active portion 15, the graphite layer acts as a reflector. This material is known as a scattering material and preferably has a low neutron absorption characteristic. Some elements as lead, deuterium oxide or bismuth may also be used. The thickness of the graphite reflector 16 may be on the order of one to three feet or more, depending upon the size of the active portion and the degree of scattering required. By using this peripheral layer of scattering material, the overall size of the active portion 15 can be slightly smaller than in a case where no scattering layer is employed, as neutron losses to the exterior are reduced. Other arrangements and combinations may be used to produce a satisfactory reflector, but for present purposes, since the reflector per se forms no part of this invention, the foregoing specific example will suffice.

The concrete walls serve as the main shield to prevent gamma radiation escaping outside the structure, as carbon being a light material absorbs gamma rays only to a relatively small extent. The water in the concrete also serves to absorb escaping neutrons.

Figure 11:
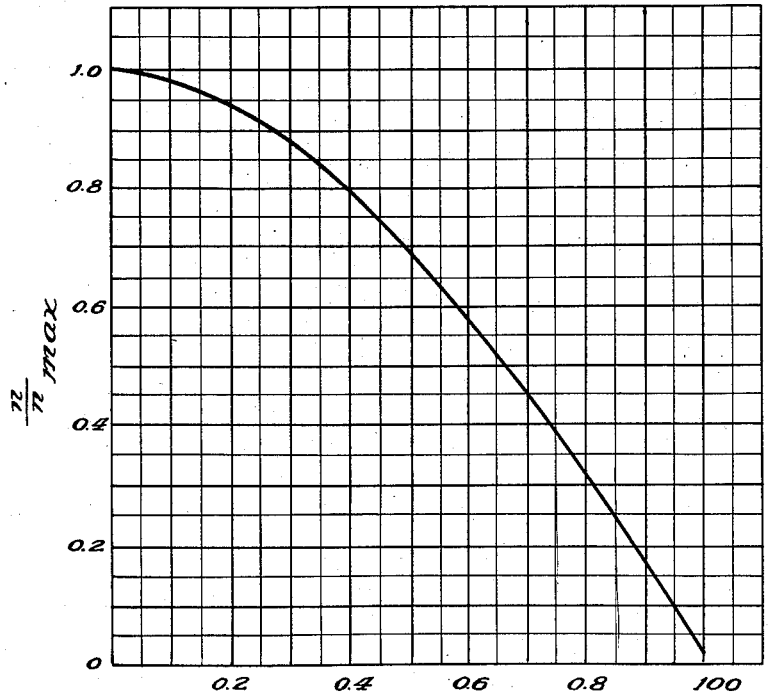
Fig. 11 is a chart or diagram showing neutron density distribution across a chain reacting system.

In Fig. 11 a curve is shown wherein the ratio of neutron density to maximum neutron density at the center of the acive portion is plotted against the ratio of the partial radius to the total radius of the active portion. It will be noted that the graph is a cosine curve and that there is a flux representing the exterior loss, extending beyond the total radius. While this loss in a carbon-uranium pile represents about 4 percent of the neutrons generated, the surface density at any point is small with respect to the maximum density. Since the number of fissions in the active portion is proportional to neutron density and the heat is due to the fissions, the diagram clearly indicates where the heat is released. Consequently, the heat distribution curve from the center to the side of the active portion approximates the neutron density distribution curve.

Accordingly, I have disposed the tubes 42, as indicated in Fig. 6, with a greater concentration near the center of the active portion 15 where the heat development is larger. In the central portion I dispose tubes 42 in a square pattern of 40 centimeters side, and distribute the remaining tubes in the outlying portions in such a way as to substantially equalize the heat dissipated in each tube. For a total heat energy production of 10,000 kilowatts the heat dissipated by each tube is about 25,000 calories per second. The heat dissipated per unit length of tubing is also greater near the center of the active portion than at the ends. Near the center of the pile, the heat dissipation amounts to about 65 calories per second per centimeter.

Allowing for a temperature rise of 25° C. of the cooling water, the flow in each pipe is 1000 cubic centimeters per second. The pressure drop for tubes of 1.5 centimeters internal diameter is 1.2 atmospheres within the pile. The water may be circulated by gravity or by pumps between headers 43 and 44. The water may be cooled and recirculated, or used only once and disposed of.

While the most efficient cooling of a pile such as described herein can be obtained by directly cooling the uranium, where the largest amount of heat is released, the graphite will be cooled directly and the uranium will be cooled by conduction with the illustrated cooling system, to such an extent that the pile can operate at from 5,000 to 10,000 kilowatts continuously without melting the uranium. The following approximate temperatures given at various places for tubes in the central portion of the pile are tabulated for 1.5 centimeters internal diameter aluminum tubes, with an average clearance of .002 inch between the tubes and the graphite, and between the uranium and the graphite, when 1000 cc./sec. of water at an entering temperature of 40° C. is passed through the tubes:

| Position | 10,000 kw. | 5,000 kw. |
| --- | --- | --- |
|  | ° C. | ° C. |
| Entering water | 40 | 40 |
| Internal surface of tube | 62 | 51 |
| External surface of tube | 82 | 61 |
| Graphite near pipe | 312 | 176 |
| Bulk of graphite | 637 | 339 |
| Graphite near uranium | 725 | 383 |
| Surface of uranium | 775 | 408 |
| Center of lump | 861 | 451 |

As the melting point of the uranium used in the pile is about 1100° C. it can be seen from the above tabulation that the pile can be safely operated at 10,000 kilowatts, when clearances are kept below .002 inch. If it should be desirable to increase clearances or to operate further away from the melting temperature of uranium, then operation at lower heat output is preferable. While piles only conductively cooled in air can operate at 5,000 to 10,000 kilowatts, they can do so for short periods only since the heat evolved tends to overheat the reactor within a very short time. By cooling the reactor it may be operated at high neutron densities continuously and thus the rate of production of the products of reaction may be increased.

After the structure has been completed, it is ready for operation. Full circulation of the coolant is started, and the neutron absorbing safety rods 40 are withdrawn from the active portion 15. The neutron absorbing control rod 32 is then slowly retracted until the galvanometer 70 indicates that the neutron density is rising. If a slow rise is desired, the rod is retracted only enough to indicate a rise. If a faster rise is desired, the rod is retracted further to increase the reproduction ratio in the system.

When any desired neutron density is reached, the control rod is pushed back into the pile until a point is found where the neutron density remains constant. At this point the system is balanced with a neutron reproduction ratio of unity. No special source of neutrons is needed in the structure, as the natural neutrons always present and constantly diffusing through the pile are sufficient to start the reaction.

To again increase the neutron density, the control rod is moved outwardly until the new desired neutron density is attained at a desired rate, and then the control rod is moved into the point where the system is again balanced, thus stabilizing the reaction at the new neutron density. If it is desired to decrease the neutron density, the control rod is pushed into the pile until the reproduction ratio is less than unity and the neutron density decays to the desired value. Then the control rod is retracted to the position at which balance is re-established. In this manner, any desired neutron density within the heat dissipating limits of the structure may be obtained and maintained. The position of the control rod in the system, therefore, does not govern the neutron density in the pile, but only the rate of change of the density.

The pile herein described has a maximum possible reproduction ratio $r$ of about 1.005, causing a doubling of the neutron density every 8 seconds with the control and safety rods completely removed. This slow rise renders the pile always easy to control and safe to operate. The low reproduction ratio in the system obtained from a geometry giving an overall K factor of 1.06 is due to the fact that the system is built close to critical size and that large quantities of neutrons are deliberately permitted to leak from well 25 and shaft 27 for use outside the pile.

The unity reproduction ratio position of the control rod within the pile for maintaining any desired neutron density would always be the same were it not for the fact that the temperature within the pile changes to some extent and influences the neutron losses in the materials and also for the fact that the pile is exposed to varying atmospheric pressure. Changes in the nitrogen content of the pile accompany changes in atmospheric pressure, and cause a variation in the K factor as nitrogen is a neutron absorbing impurity. The unity reproduction ratio point on the control rod, therefore, changes slightly in accordance with the temperature at which the pile is being operated and with the atmospheric pressure. Changes due to ambient temperature of the air and the cooling water are relatively small and the balanced position of the rod can readily be calibrated for temperature effect. Changes due to atmospheric pressure are also small and can be compensated for.

If at any time it is desired to stop the reaction, the control rod is inserted deep within the pile until the reproduction ratio becomes less than the value necessary to maintain the reaction with this size of structure. The neutron density then decays to that of the natural neutrons. The safety rods are also inserted when the pile is left unattended. If desired, the safety rods may be pulled into the system by weights tripped by an emergency latch (not shown) in case of failure of the control to control the reaction for any reason, or upon failure of coolant circulation. It is also possible to control the position of the control rod 32 by means of automatic connection to the monitoring circuit, although such automatic control forms no part of the present invention and is not required in the system described.

The reactor as described has many uses. Radioactive fission products and new elements, both radioactive and stable, are produced by fission and absorption of neutrons in the uranium. Large quantities of neutrons and penetrating gamma rays are produced and can be utilized.

The radioactive fission products and the $94^{239}$ produced by normal operation of the pile can be recovered after a predetermined exposure of the uranium bodies in the pile to high neutron densities by removing the uranium bodies, dissolving them in a suitable solution, and extracting the desired elements. This separation does not constitute any part of the present invention and, therefore, no details are herein given. Radioactive fission products are valuable as gamma radiation sources and for use as biological tracers in medicine, while $94^{239}$ is useful as a fissionable material to increase K factors when added to natural uranium, or when used alone, in chain reacting systems.

Well 25, extending through the concrete and carbon shield and exposing the outer layer of uranium bodies, permits the entire energy spectrum of neutrons in the pile to reach the interior of the well. Therefore, well 25 can be packed with any material desired and the scattering effect of the material determined, for example. Again, isotopes of, or transmutations to various elements can be produced in large quantities by packing these elements into the well and exposing them to the action of the neutrons escaping from the periphery of the reactor. One example of isotope production, followed by transmutation, is the manufacture of $U^{233}$ from thorium 232, for which process thorium 233 can first be produced from thorium 232 in well 25 in accordance with the slow neutron density in the well and time of exposure, the extent of the reaction being dependent on the product of those factors. Thorium 233 then decays to form protoactinium 233 and thence to uranium $92^{233}$ which is valuable as a fissionable material similar in its action to $U^{235}$ and $94^{239}$. The reaction is as follows:

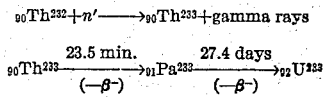

As a further example of transmutation, radioactive carbon may be produced by allowing the neutrons leaving the pile to react with nitrogen in compound form in well 25. This reaction gives rise to carbon of mass 14 which is radioactive, and can be separated chemically from the nitrogenous compounds. Such radioactive carbon is suitable for medical and physiological uses as it may be incorporated in organic compounds and used as tracers in living organisms.

It can thus be seen that the neutrons normally escaping from the pile need not be lost, but can be put to work. Continuous operation at from 5,000 to 10,000 kilowatts accelerates the effect of the neutrons by permitting continuous bombardment at high neutron densities.

In utilizing the output of the pile, shaft 27 also plays an important role. It extends to the center of the pile where the highest neutron density exists, and intense neutron bombardment of materials inserted into the bottom of this shaft will take place, particularly at high pile powers. Furthermore, the shaft acts to collimate the fast neutrons released at the center of the pile and a high density collimated beam of neutrons emerges through the aperture, projected upwardly. This collimated beam, having a far greater neutron density than any produced by other means, can be utilized outside of the pile for nuclear research in all of its aspects. The number of neutrons escaping from shaft 27 is about four or five times the number escaping over an area of the external surface of the pile equal to the cross section of shaft 27, In addition, extremely high energy gamma rays are emitted during nuclear fission. These rays also escape through shaft 27 to the exterior of the pile and can there be used for taking radiographs through large castings, for example, with relatively short exposures during high power operation of the pile. The neutrons coming from the pile can be screened out of the gamma ray beam by the use of relatively thin sheets of materials having high neutron absorption cross sections without substantially reducing the gamma ray intensity. In addition, a bismuth filter has been found to effectively reduce the gamma rays without substantial interference with the neutron beam. Thus shaft 27 can be used either to produce a high intensity collimated neutron beam, or to produce a high energy beam of gamma rays, as desired both for use outside the pile. When using the pile in this manner, a heavy sheathing of lead is preferably positioned over the top of the pile and apertured for well 25 and shaft 27. The personnel working on the top of the pile will then be adequately protected from the effects of gamma rays generated by the pile and escaping around the periphery thereof.

While I have described my invention as applied to a structure in which the moderator only is cooled by circulating a liquid therethrough, it is distinctly to be understood that in certain structures both the moderator and the uranium can be directly cooled, although the direct cooling of the uranium is no part of the present invention. Consequently, I do not desire to limit my invention to a chain reacting system wherein only the moderator is directly cooled but desire to apply the invention described and claimed herein to any chain reaction system whether or not otherwise cooled. It is also to be understood that my invention is equally applicable to other types of reactors including those having liquid moderators such as deuterium oxide or other reactors constructed in accordance with the general principles described in the present application or copending application of Enrico Fermi and Leo Szilard, Serial No. 568,904, filed December 19, 1944, now Patent No. 2,708,656, dated May 17, 1955. For example uranium containing greater than usual concentrations of $U^{235}$ may be used. Alternatively the invention may be applied to other fissionable compositions such as $U^{233}$, $94^{239}$ etc. or to combinations of these fissionable isotopes with $U^{238}$ or $Th^{232}$ or similar isotope which yields a fissionable isotope by neutron absorption.

While the theory of the nuclear chain fission mechanism in uranium set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

What is claimed is:

1. A neutronic reactor comprising an active portion consisting of blocks of graphite arranged in layers to form a cube six meters on a side, about 27,000 bodies of natural uranium having a total weight of about 80 tons disposed in holes in alternate layers of graphite blocks, the spacing of the uranium elements in the graphite being such that each unit cell comprising one uranium body and surrounding graphite has a side size of 20 centimeters, 97 horizontal aluminum tubes containing flowing water disposed in the layers of graphite blocks which do not contain uranium, and means for controlling the reactor.

2. The reactor according to claim 1 wherein the tubes are more closely spaced at the center of the reactor than toward the outside of the reactor to equalize the removal of heat.

References Cited in the file of this patent

UNITED STATES PATENTS

| | | |
|---|---|---|
| 400,160 | Babbitt | Mar. 26, 1889 |
| 1,769,994 | Hendryx | July 8, 1930 |
| 2,006,649 | Modine | July 2, 1935 |
| 2,127,193 | Toulmin | Aug. 16, 1938 |
| 2,206,634 | Fermi et al. | June 2, 1940 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |

OTHER REFERENCES

Naturwissenschaften, vol. 27 (1937), pages 402–410.

Smyth: "Atomic Energy for Military Purposes," pages 103, 104, August 1945. Copy may be purchased from the Supt. of Documents, Washington 25, D.C.

Kelly et al.: "Physical Review," 73, 1135–39 (1948).